Sept. 16, 1941.   J. A. ROCHÉ   2,255,814
LOAD DISTRIBUTION INDICATOR
Filed Oct. 8, 1937   3 Sheets-Sheet 1

INVENTOR
JEAN A. ROCHÉ
BY John J. Horan
and Ebade Koontz
ATTORNEYS

Sept. 16, 1941.                J. A. ROCHÉ                2,255,814
                       LOAD DISTRIBUTION INDICATOR
                         Filed Oct. 8, 1937          3 Sheets-Sheet 2
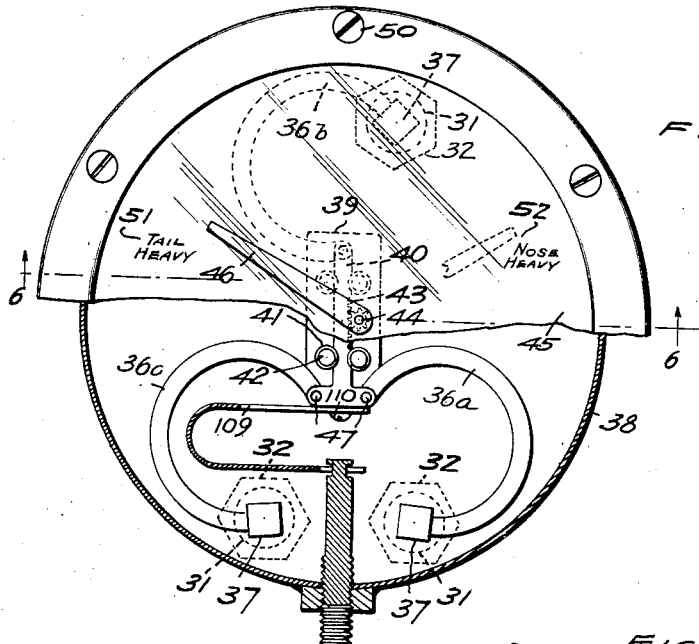
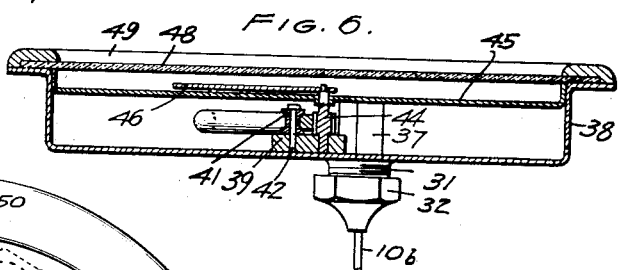
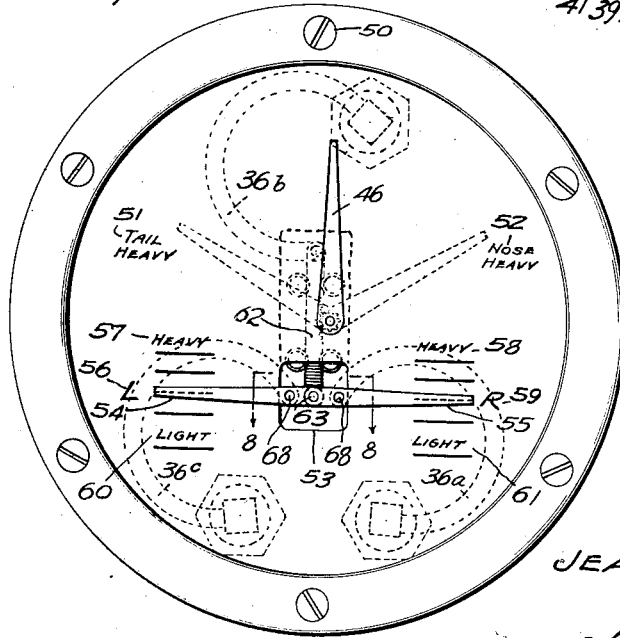
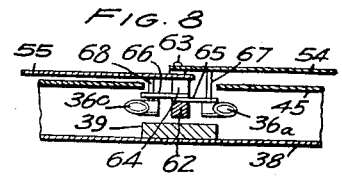
INVENTOR
JEAN A. ROCHÉ
By John J. Homan
   and
   Flade Kontz
   ATTORNEYS Sept. 16, 1941.                J. A. ROCHÉ                2,255,814
                         LOAD DISTRIBUTION INDICATOR
                            Filed Oct. 8, 1937                3 Sheets-Sheet 3
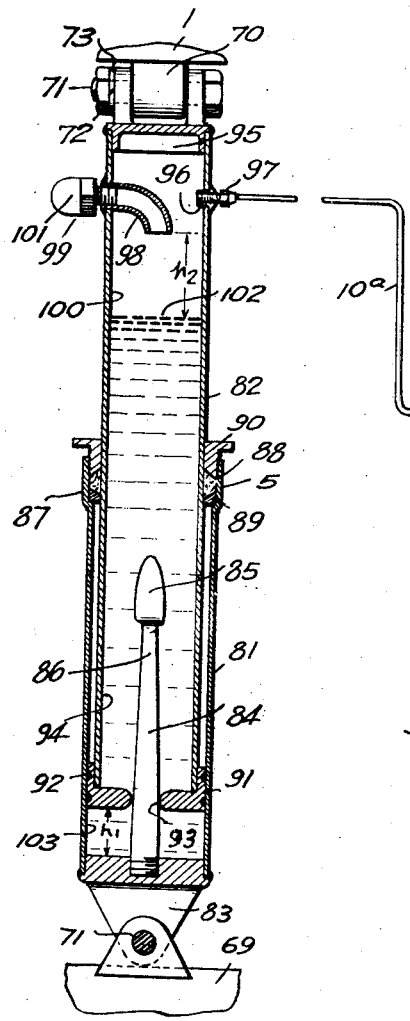
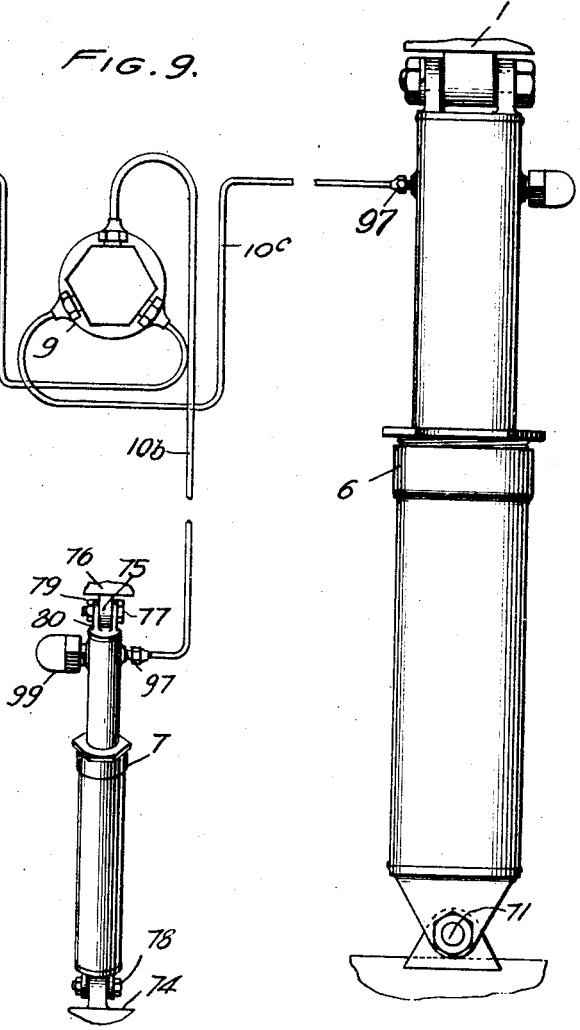
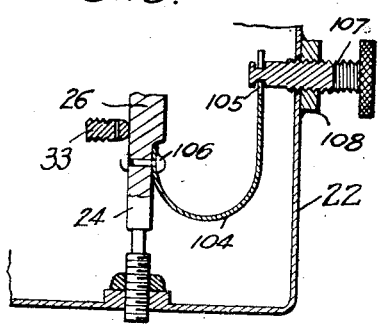
INVENTOR
JEAN A. ROCHÉ
BY John J. Honan
and Ebade Koontz
ATTORNEYS Patented Sept. 16, 1941

2,255,814

UNITED STATES PATENT OFFICE 2,255,814

LOAD DISTRIBUTION INDICATOR

Jean A. Roché, Dayton, Ohio

Application October 8, 1937, Serial No. 168,027

18 Claims. (Cl. 265—40)

(Granted under the act of March 3, 1883, as amended April 30, 1928; 370 O. G. 757)

The invention described herein may be manufactured and used by or for the Government for governmental purposes, without the payment to me of any royalty thereon.

The present invention, which relates in general to vehicles and more particularly to means for indicating improper load distribution therewithin prior to operation thereof, is a continuation, in part, of my co-pending application, Serial No. 710,475, filed February 9, 1934.

The primary object of the invention is to provide means whereby operators of land or air vehicles may be acquainted in advance of load placements introducing unnecessary hazard to the normal operation of their vehicles.

My invention finds particular application to aircraft in that it provides means whereby the pilot may readily ascertain that the cargo or passenger load he is transporting is disposed in a manner bringing the center of gravity of the whole within the designed longitudinal and lateral limits of his aircraft.

Another object of the invention is to provide in aircraft equipped with outboard fuel tanks, means by which the pilot may detect improper filling of fuel tanks prior to take-off.

With the foregoing and other objects in view, which will appear as the description proceeds, the invention consists of certain new and novel improvements in load distribution indicators which will be hereinafter more fully illustrated and described in the accompanying drawings and more particularly pointed out in the appended claims.

Referring to the drawings, in which numerals of like character designate similar parts throughout the several views:

Fig. 5 is a second embodiment of the indicating element;

Fig. 6 is a cross-sectional view of Fig. 5 on the line 6—6;

Fig. 7 shows a third embodiment of the indicating element;

Fig. 8 is a cross-sectional view of Fig. 7 on the line 8—8;

Fig. 9 shows interconnection of the indicating element of Fig. 1 with three struts supporting the tail and landing gear wheels of an airplane; and Fig. 10 is a partial cross-sectional view of Fig. 4 on the line 10—10.

Figure 1:
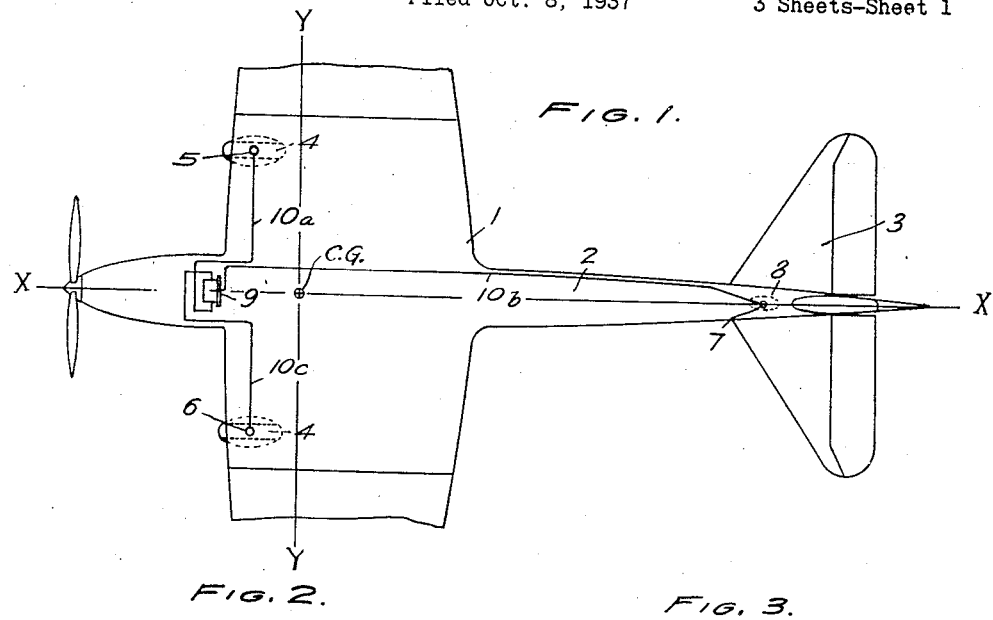
Fig. 1 shows a diagrammatic installation of my invention.

In Figs. 1 and 9, the central portion of a wing panel 1 is shown fixedly secured to a fuselage 2 of a conventional airplane. Landing gear wheels 4, carried by independent axles 69, are yieldingly connected to the undersurface of the wing panel 1 by means of oil and air struts 5 and 6, mounting lugs 70, bolts 71, retaining nuts 72 and lock washers 73. A tail wheel 8, carried by a conventional yoke 74, is yieldingly connected to the fuselage 2 just forward of tail surfaces 3 by means of an oil and air strut 7, a mounting lug 75 depending from a fuselage brace member 76, bolts 77 and 78, retaining nuts 79 and lock washers 80. Conventional longitudinal and lateral axes $x$—$x$ and $y$—$y$ are shown passing through the "CG" of the aforesaid airplane. Within convenient vision of the pilot is located an indicating element 9 of my invention. The indicating element 9 is operatively connected to an upper extremity of each of the aforesaid struts, a tube 10a terminating at the right strut 5, a tube 10c terminating at the left strut 6, and a tube 10b terminating at the rear strut 7. In accordance with my invention, a change in indication of the element 9 will take place only when the relation of the load ratios at the struts 5, 6 and 7 change. Referring to Fig. 1 and assuming "W" to represent the gross weight of an airplane loaded in any manner, this weight may be broken down into "$W_T$" supported by strut 7, "$W_R$" supported by strut 5, and "$W_L$" supported by strut 6. If the indication of the element 9 is to remain unchanged, it is essential that each of the ratios $W_T/(W_R+W_L)$, $W_R/(W_L+W_T)$, and $W_L/(W_R+W_T)$ in and of itself remain constant. It is thus evident that mere increase or decrease in the magnitude of "W," i. e., the sum of the reactions, will not cause the element 9 to change its indication. On the other hand, any shifting of "W" parallel to axis $x$—$x$ or axis $y$—$y$ will destroy the constancy of all of the above ratios and cause the element 9 to change indication.

Figure 2:
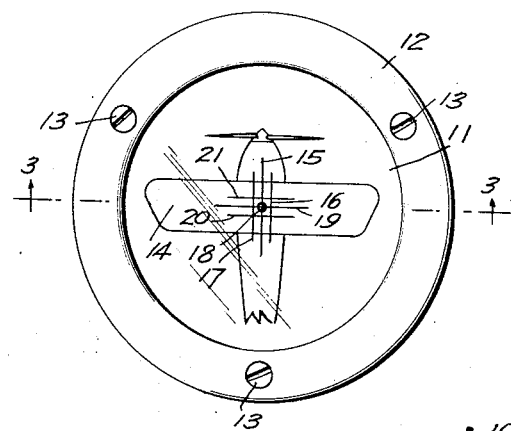
Fig. 2 shows the indicating element of a preferred embodiment of my invention.

Fig. 2 shows the face of one embodiment of the indicating element 9. A cover glass 11 is secured to the body portion of the indicating element 9 by means of a retaining ring 12 and screws 13. The cover glass 11 is provided with a phantom outline 14 depicting the forward plan view of a conventional airplane. The longitudinal center line of the outline 14 is indicated by a reference line 15 corresponding to longitudinal axis x—x of Fig. 1. To right and left of the reference line 15 are further reference lines 16 and 17. The center of gravity of any airplane to which the outline 14 is applied, should be normally disposed upon the reference line 15. The aforementioned center of gravity is represented in Fig. 2 by an indicating knob 18, the full significance of which will be dealt with hereinafter. The cover glass 11 need not be calibrated or engraved until the installation of the element 9 is accomplished. The calibrations can then be effected by placing the airplane on scales and the computed center of gravity location then inscribed upon the dial, by passing of a reference line 19 corresponding to lateral axis y—y of Fig. 1 through the midpoint of the plan projection of the indicating knob 18 normal to reference line 15. The point of intersection of reference lines 15 and 19 represents longitudinal and lateral placements of center of gravity of an aircraft to which my invention is applied. Additional reference lines 20 and 21 are positioned fore and aft of the reference line 19 and parallel thereto. The full significance of the longitudinal reference lines 16 and 17 and the lateral reference lines 20 and 21 will be dealt with hereinafter.

Figure 3:
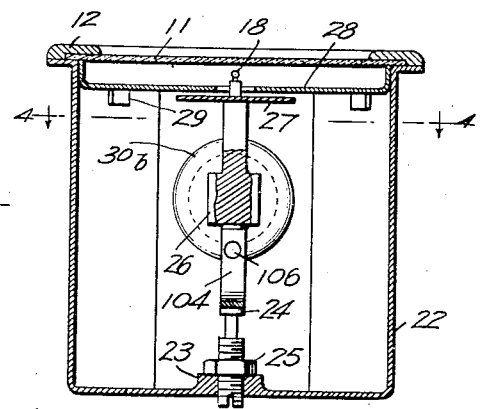
Fig. 3 is a cross-sectional view of Fig. 2 on the line 3—3.

Fig. 3 is a longitudinal cross-sectional view of the indicating element shown in Fig. 2. The body portion thereof consists of a shell or housing 22, flanged at its uppermost portion to support the glass 11 and retaining ring 12. The lower central portion of the housing 22 is provided with a tapped boss 23 into which is screwed a needle 24. A check nut 25 is provided for locking the needle 24 against rotational movement with respect to the housing 22. The needle 24 is reduced in cross-sectional area immediately above the check nut 25 to lend flexibility thereto. The central portion of the needle 24 is enlarged to form a triangular prism 26. The needle 24 terminates at its upper extremity in the indicating knob 18, previously shown in Fig. 2, the said upper extremity being reduced in diameter to receive and hold a disc 27. A plate 28 is cut away at its central portion, to permit passage of the indicating knob 18 therethrough. The underside of the plate 28 rests upon brackets 29 fixedly secured to the inner side of the housing 22. An end profile of a Sylphon 30b is shown immediately behind the prism 26.

Figure 4:
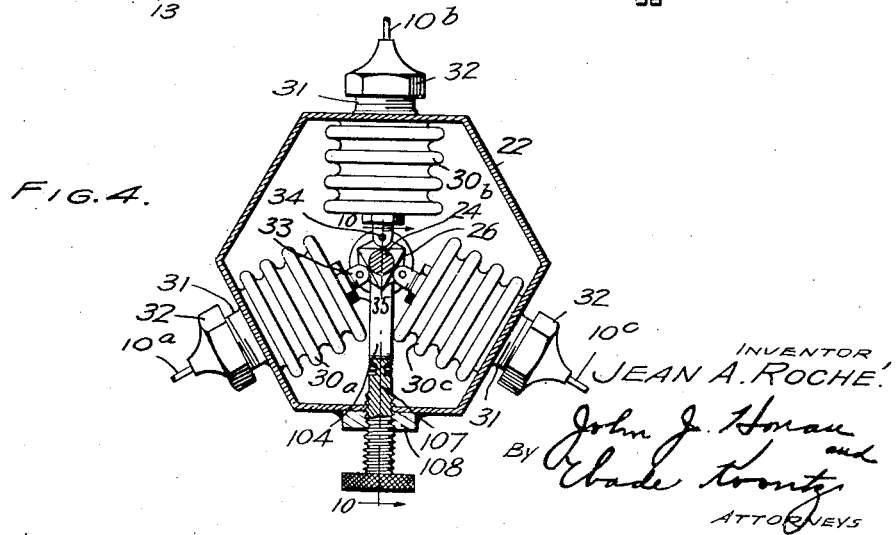
Fig. 4 is a partial cross-sectional view of Fig. 3 on the line 4—4.

Fig. 4 shows a cross-sectional view, in plan, of the indicating element 9 taken from a point immediately above the Sylphon 30b of Fig. 3. The bases of the Sylphons 30a, 30b and 30c are fixedly attached to the housing 22 and extend therethrough to form threaded bosses 31, adapted to receive nuts 32, of the tubes 10a, 10b and 10c. The outer extremities of the Sylphons 30a, 30b and 30c are provided with internal bosses, into which are screwed adjustable stems 33. The extremities of the stems 33 are curvedly shaped and are provided with holes 34 for receiving a tool for rotating the stems about their longitudinal axes. Following the aforesaid adjustment, the stems 33 are locked against rotation with respect to the Sylphons 30a, 30b and 30c by means of check nuts 35. It should be noted that the Sylphon 30a is connected with the tube 10a, the Sylphon 30b with the tube 10b and the Sylphon 30c with the tube 10c; thereby operatively connecting, in order named, the Sylphons 30a, 30b and 30c with struts 5, 7, and 6, respectively. It should be further noted at this point that the operating pressures of the forward struts 5 and 6 need in no wise be identical to the operating pressure maintained in the rear strut 7 to insure desired indication change in the element 9. The Sylphons 30a, 30b, and 30c, the Bourdon tubes 36a, 36b and 36c (discussed below), or other gauge element serving a similar purpose can be selected so that they will have characteristics giving desired calibrations on cover glass 11.

The three stems 33 are so adjusted with reference to the Sylphons 30a, 30b and 30c that the indicating knob 18 is made to assume the position shown in Fig. 2. It is to be understood that slight longitudinal variation of the indicating knob 18, with reference to the transverse line 19, may be arbitrarily assumed to effect allowance for unavoidable differences arising due to unusual shifting of the center of gravity between the extremes of weight empty and fully loaded condition. In this connection it should be stated that less discrepancy is met with in cargo airplanes than in passenger carrying transports. In the latter type of airplane, it is possible for a diminished passenger load to be so positioned at the aft extremity of the passenger cabin that the longitudinal balance of the aircraft is seriously affected. Through employment of my invention, it is possible for the pilot to detect the aforementioned improper passenger distribution, prior to take-off, and to effect proper redistribution of the passenger load.

Not desiring to limit myself, in indicating pressure differences between struts 5, 6, and 7, to exclusive use of Sylphon indicating means, I have shown in Figs. 5 and 6 a second embodiment of indicating element 9. Three Bourdon tubes 36a, 36b and 36c, are fixedly secured at their outer extremities to base brackets 37. The brackets 37 are in turn fixedly secured to the bottom of a housing 38 and extend through the underside thereof to form threaded bosses 31. The outer end of each Bourdon tube is operatively connected to a tube by means of a nut 32. A mounting base 39 is centrally disposed within the housing 38. A T-shaped connector 40 is slidably secured to the base 39 by means of four rollers 41 and retaining pins 42. The connector 40 is provided with a rack portion 43 held in operable engagement with a pinion gear 44. The lower extremity of the gear 44 is journaled to the base 39, while the upper extremity thereof is similarly journaled in a bearing provided at the central portion of a plate 45. The plate 45 is inserted into the open end of the housing 38 and pressed down until it rests securely against the three brackets 37. A pointer 46 is firmly secured to the upper extremity of the gear 44. The inner extremities of the Bourdon tubes 36a and 36c are pivotally secured to the lower extremities of the connector 40 by means of pins 47, while the inner extremity of Bourdon tube 36b is similarly attached to the upper extremity of the connector 40 by means of a pin 47. The upper portion of the housing 38 is flanged outwardly in order that the open end thereof may be sealed by a cover glass 48 and retaining ring 49. The ring 49 is secured to the aforementioned flanged portion of the housing 38 by means of screws 50. It will be noted that the plate 45 is provided with two legends 51 and 52. When the outer extremity of the pointer 46 is centrally disposed with reference to legend 51, as shown in Fig. 5, a condition of maximum "tail heaviness" is indicated. When the outer extremity of the pointer 46 is centrally disposed with reference to legend 52, a condition of maximum "nose heaviness" exists.

Figs. 7 and 8 show modification, in part, of certain of the elements of Figs. 5 and 6. The inner extremities of the Bourdon tubes 36a and 36c are provided with linked connection to a modified connector. A portion of the link connection extends through an opening 53 provided in the plate 45, and takes the form of pointers 54 and 55. Detailed operation of the pointers 54 and 55, as well as significance of the legends 56 through 61, are dealt with below.

Fig. 8 is a cross-sectional view through the line 8—8 of Fig. 7, and discloses linked attachment of a connector 62 to Bourdon tubes 36a and 36c respectively. It will be noted that the T-shaped connector 40 utilized in Figs. 5 and 6, has been replaced by a simple link with identical ends. The pointers 54 and 55 are concentrically and pivotally attached to the lower extremity of the connector 62 by means of the pin 63, of the pointer 54 and the boss 64, of the pointer 55. It will be noted that links 65 and 66 form an operative connection between the inner extremities of the Bourdon tubes 36a and 36c and the lower extremity of the connector 62. The pin 63 serves to secure the inner extremities of the links 65 and 66 to the connector 62, while the pins 67 and 68 of the pointers 54 and 55, respectively, serve to further link the aforementioned connector to the inner extremities of the Bourdon tubes 36a and 36c. The operation of the aforementioned parts are described in detail below.

Adjustment of the first embodiment of my indicating element 9 may best be understood by reference to Figs. 3 and 4. The glass 11, the retaining ring 12 and the plate 28 are removed from the housing 22, the check nuts 35 loosened, and the curved portions of the stems 33 so adjusted with respect to one another that the center of the indicating knob 18 is brought into coincidence with the longitudinal axis of the housing 22. Upon reinstallation of the plate 28, retaining ring 12, and glass 11, the plan appearance of the indicating knob 18 will be that of Fig. 2. The aforementioned adjustment may be readily accomplished by insertion of the proper tool within the openings 34 provided at the outer extremities of the stems 33. Following desired adjustment the stems 33 are locked fast to their respective Sylphons by means of the check nuts 35.

Let it be assumed that an airplane is serviced in preparation for take-off. Let it be further assumed that only a partial capacity load is available for transportation and that this load is improperly concentrated at the rear of the load carrying compartment. The aforementioned load placement will cause the center of gravity of the airplane to move to the rear of the designed position of the center of gravity of the airplane with load properly disposed. This rearward shifting of the load will bring about pressure decrease in the struts 5 and 6 and pressure increase in the strut 7. Pressure changes within the struts 5, 6 and 7 are in turn transmitted through the tubes 10a, 10c and 10b to the Sylphons 30a, 30c and 30b, causing the two former to recede and the latter to move outwardly from the supporting wall of the housing 22. As viewed in Fig. 4, downward movement of the triangular prism 26 will cause corresponding downward movement of the indicating knob 18 towards the line 20 shown in Fig. 2. Through reference to the indicating element 9 the pilot is advised of the presence or absence of dangerous cargo placement and if the former prevails may take steps to correct the same prior to take-off.

Where multi-engined airplanes are equipped with my invention and passengers or cargo are carried outboard of the fuselage, improper lateral disposition of the aforementioned load may be readily ascertained by reference to the indicating element 9. Assuming undue shifting of the load to the right of the longitudinal axis $x$—$x$ of the fuselage 2, shown in Fig. 1, pressure increase in the strut 5 and pressure decrease in the strut 6 will occur. As a result of the foregoing pressure differences, the Sylphon 30a will expand outwardly and the Sylphon 30c contract inwardly, causing corresponding right-hand movement of the indicating knob 18 towards the line 16 shown in Fig. 2. It will be noted that no pressure change occurs in the strut 7. Through reference to the indicating element 9, the pilot readily detects necessity for load rearrangement.

The operation of the second embodiment of the indicating element 9 is set forth below. Referring to Figs. 5 and 6, it will be seen that abnormal pressure increase in the strut 7 causes expansion of the Bourdon tube 36b with accompanying downward movement of the connector 40. Simultaneous downward movement of the rack portion 43 causes counter-clockwise movement of the pinion gear 44 and pointer 46 fixedly secured thereto. The aforementioned movement causes the pointer 46 to take the position shown in Fig. 5 with the tip portion thereof opposite the legend "Tail heavy."

It will be noted in the preceding embodiment of my indicating element 9 that the inner extremities of the Bourdon tubes 36a and 36c are fixed against longitudinal movement with respect to the connector 40. In the third embodiment of my indicating element 9, a linkage is introduced permitting independent movement of the inner end of Bourdon tube 36a with respect to the inner end of the Bourdon tube 36c. In Figs. 7 and 8, it will be seen that while the bases of the pointers 54 and 55 are pivoted about a common pin 63, the body portions of the aforementioned pointers have independent linked connection through the pins 67 and 68 and auxiliary links 65 and 66 with the outer extremities of the Bourdon tubes 36a and 36c. Assuming, in a multi-engined airplane, undue shifting of load to the right of the longitudinal axis of the fuselage 2 with attendant pressure increase in the strut 5 and pressure decrease in the strut 6, the Bourdon tube 36a operatively connected with the strut 5 will expand, causing counter-clockwise rotation of the pointer 55 towards the legend "Heavy" and the Bourdon tube 36c operatively connected with the strut 6 will contract, causing counter-clockwise rotation of the pointer 54 towards the legend "Light." Obviously, shifting of the aforementioned load to the left of the longitudinal axis $x$—$x$ of the fuselage 2 brings about reversal of pointer readings, either set of which are readily understandable to a pilot referring to the same. It is also apparent that proper lateral distribution of the passengers or cargo of an airplane, when combined with improper longitudinal disposition of the same, effects consistent relationship between the readings of the pointer 46 and those of the correlated pointers 54 and 55. Excessive forward placement of a load is attended by upward tilt of the pointers 54 and 55 towards the legend "Heavy" and movement of the pointer 46 to a position opposite the legend "Nose heavy." Rearward placement of a load is accomplished by downward tilt of the pointers 54 and 55 and counter-clockwise movement of the pointer 46 from the position shown in Fig. 7.

It is readily apparent from Fig. 9 that the description of the physical disposition of the several operating parts of the strut 5 equally applies to the operating parts of the remaining struts 6 and 7, the latter struts being identical to the former with the exception of scale reduction. The strut 5 is composed of a cylinder 81 and a hollow piston 82. The cylinder 81 is sealed at its bottom extremity by a combination mounting lug-header 83. A metering pin 84, provided with a bullet-shaped or stream-lined head 85 and a calculated or predetermined frustro-conically tapered body portion 86, is secured fast to the mounting lug-header 83. The upper end of the chamber 81 is flared out to provide a sealing gland 87. The gland 87 is composed of a packing 88, a retaining ring 89, and a packing gland nut 90. The piston 82 is provided with a head 91, having oil grooves 92 and a central orifice 93, and with a central hollow chamber 94. The upper extremity of the piston 82 is secured to the mounting lug 70 of the wing panel 1 by means of a combination mounting lug-header 95. Immediately below the aforesaid connection are provided a mounting boss 96 for a pipe connection 97 and a fluid filler tube 98 threaded at its upper end to receive an air-or-oil ingress fitting 99, the detailed functions of which will be more fully stated hereinafter. The outboard end of the pipe 10a is connected to the piston 82 of the strut 5 by means of the fitting 97. The remaining tubings 10b and 10c, leading away from the centrally disposed indicating element 9, are similarly connected to struts 6 and 7 by means of two like pipe fittings 97.

The three struts shown in Fig. 9 represent, respectively, the right landing gear wheel strut 5, left landing gear wheel strut 6, and the tail wheel strut 7, of an airplane. The figure also shows the connection of the center of gravity indicator instrument 9 to air chamber portions 100 of the hollow pistons 82 by means of pipes 10a, 10b, and 10c.

In current airplanes, it is customary to service air and oil struts without jacking up the airplane, i. e., the bottom of the piston head 91 rests upon and is entirely supported by the top face of mounting lug-header 83. The proper quantity of oil is poured in through tube 98, which, by the length of its depending portion, governs the quantity introduced, since it would be impossible to add more oil after the level reaches the bottom opening of this tube, the upper chamber being sealed. Fitting 99, which incorporates an air valve 101, is then installed and the air inflation process is begun by means of a suitable high pressure air pump. At first, there is no relative displacement between the cylinder 81 and the piston 82, but when a pressure sufficient to equilibrate the forces which hold the aforesaid cylinder and piston in the collapsed condition is reached, further pumping of air into the chamber 100 does not increase the pressure therewithin but only serves to extend the over-all length of the strut 5, forcing the liquid 102 through the orifice 93 so that the volume of the lower chamber 103 increases from zero to the value shown in Fig. 9, corresponding to the spacing $h_1$ between cylinder bottom 81 and lower piston face 82, which is the same volume as that corresponding to the space $h_2$ in the upper chamber. The air pressure above the liquid 102 is, therefore, constant, even if pumping should be abnormally continued until the strut had been fully extended, after which the pressure therewithin would begin to increase, if the pumping process were continued. In current practice, however, this pumping process is continued only until the shock absorber strut 5 is extended about 20 per cent of its maximum possible travel, corresponding to a normal static position in which the bottom of the piston head 91 is carried a distance $h_1$ above the top surface of the cylinder bottom or mounting lug-header 83.

As the airplane leaves the ground, the pressure in the air chamber 100 above liquid 102 is sufficiently great to fully extend the strut, such that the top of the head 91 firmly seats against the bottom of the retaining ring 89, and that the maximum diameter of the bullet-shaped head 85 is positioned within the central orifice 93. During the initial impact of landing, metering of liquid through the orifice 93 is so restricted by the head 85 that the pneumatic suspension medium represented by the air in any one of the tires 4 will be compressed and said tire deflected to a predetermined extent. During this period of deflection of the aforesaid tire, the impact load of the airplane will have been built up to an allowable maximum and, in addition, a part of the kinetic energy of the airplane will have been absorbed by metering of liquid through the restricted orifice 93 and the head 85 will have moved slightly beyond the orifice 93. Thereafter, the aforesaid tire remains deflected under said maximum impact load as the remainder of the kinetic energy is being dissipated. The dimensions of the tapered body portion 86 (of the metering pin 84) are so calculated as to maintain the aforesaid predetermined load substantially constant throughout the major portion of the downward stroke of the hollow piston 82. Upon termination of the latter, the liquid from the lower chamber 103 has been transferred into the upper chamber 94, thus compressing the air trapped in the latter chamber back to the normal inflation pressure or slightly beyond if the landing is so severe as to cause the bottom surface of the piston head 91 to come into contact with the top surface of the mounting lug-header 83. If this extreme condition occurs, the pressure in the air chamber 100, above liquid 102, will be increased by some 30 per cent, the volume of the air chamber 100 being selected beforehand to prevent a much higher pressure from being generated. It will thus be seen that the instrument connected with the three air chambers 100 will never be greatly overloaded, whereas the liquid pressure in the lower chamber 103 may reach very high values due to the great speed at which the shock strut may be compressed. It thus follows that while the airplane may suffer accelerations of high magnitude, such as four to seven times gravity, and the oil in the lower chamber 103 may suffer pressures correspondingly greater than the normal inflation pressure during the impact with the ground, the pressure in the air chamber 100 will suffer only a fractional increment above its value when the airplane is at rest on the ground, and consequently no destruction of the instrument 9 can result under any operating condition of the shock absorber.

In Fig. 10, I have provided the needle 24 with auxiliary means for manually adjusting the indicating knob 18 along the longitudinal reference line 15 of Fig. 2. The aforesaid adjustment consists of a J-shaped spring 104, with a centrally located upper slot 105, fixed to the needle 24 by means of a rivet 106. The spring 104 is tensioned to either side of the zero setting shown in Fig. 10 by means of a thumb screw 107. The screw 107 is secured to the side of the housing 22 by means of a mounting boss 108. A top plan view of the above enumerated parts is also shown in Fig. 4. The same scheme of adjustment may be applied to both Figs. 5 and 7. In the former, the spring 109 is shown fixed to the bottom of the connector 40 by means of a screw 110.

I claim:

1. In an indicating system, the combination with three shock struts, each strut having a plurality of chambers, one of said chambers being subject to a pressure less than that of another during the shock of landing, of means for indicating the pressure ratio relation of the lesser pressure chambers of said shock struts comprising, a corresponding number of separate pressure responsive elements operatively connected with said lesser pressure chambers, and an indicator operatively connected with said pressure responsive elements capable of movement in at least two different planes as a function of a change in the pressure ratio relation of said lesser pressure chambers.

2. In an indicating system, the combination with three shock struts, each strut having a plurality of chambers, one of said chambers being subject to a pressure less than that of another during the shock of landing, of means for indicating the pressure ratio relation of the lesser pressure chambers of said shock struts comprising, separate pressure responsive means communicatively connected with said lesser pressure chambers and an indicator operatively connected with said pressure responsive elements capable of movement in at least two different planes as a function of a change in the pressure ratio relation of said lesser pressure chambers.

3. An indicator comprising, three pressure responsive elements adapted to be connected to three independent pressure sources and indicating means capable of movement in at least two different planes coupled to and movable in response to variations in the pressure of said pressure responsive elements whereby to indicate the pressure ratio effects of said pressure responsive elements with respect to two directions independently or in combination.

4. An indicator comprising, three pressure responsive elements adapted to be connected to three independent pressure sources and indicating means capable of movement in at least two different planes coupled to said pressure responsive elements in such a manner as to indicate any variation in the pressure ratio relation of said pressure sources.

5. An indicator comprising, three pressure responsive elements adapted to be connected to three independent pressure sources and indicating means capable of movement in at least two different planes coupled to said pressure responsive elements in such a manner as to indicate any variation in the pressure ratio relation of said pressure sources, and adjusting means for setting said indicator means to a pre-determined position corresponding to a desired pressure ratio relation.

6. A longitudinal load distribution indicator comprising, a plurality of pressure responsive elements disposed in a common plane and adapted to be connected to a like number of independent pressure sources, a housing for supporting a fixed end of each pressure responsive element, a plurality of tubes, each of said tubes operatively connecting the fixed end of one of said pressure responsive elements to one of said pressure sources, a connector having a rack and being slidably secured to said housing as well as pivotally attached to the free ends of said pressure responsive elements, a pinion gear pivotally secured to said housing in operable engagement with said connector rack, and a pointer attached to said gear for indicating degree of rotation of same.

7. A longitudinal load distribution indicator comprising, a plurality of pressure responsive elements disposed in a common plane and adapted to be connected to a like number of independent pressure sources, a housing for supporting a fixed end of each pressure responsive element, a plurality of tubes, each of said tubes operatively connecting the fixed end of one of said pressure responsive elements to one of said pressure sources, a connector having a rack and being slidably secured to said housing as well as pivotally attached to the free ends of said pressure responsive elements, a pinion gear pivotally secured to said housing in operable engagement with said connector rack, a pointer fixedly attached to said gear and a scale associated with said pointer for interpreting movements thereof.

8. A longitudinal and lateral load distribution indicator comprising, a plurality of pressure responsive elements disposed in a common plane and adapted to be connected to a like number of independent pressure sources, a housing for supporting a fixed end of each pressure responsive element, a plurality of tubes, each of said tubes operatively connecting the fixed end of one of said pressure responsive elements to one of said pressure sources, a connector having a rack and being slidably secured to said housing, one end of said connector being pivotally attached to the free end of one of said pressure responsive elements, a pinion gear pivotally secured to said housing in operable engagement with said connector rack, a pointer fixedly attached to said gear, a scale associated with said pointer for interpreting movements of said connector, and indicating means associated with the remaining end of said connector and movably independent and with the free ends of the remainder of said pressure responsive elements for showing relative movements between said connector and the aforesaid free ends of said last-mentioned responsive elements.

9. A load distribution indicator comprising, a plurality of pressure responsive elements disposed in a common plane and adapted to be connected to a like number of independent pressure sources, a housing for supporting a fixed end of each pressure responsive element, a plurality of tubes, each of said tubes operatively connecting the fixed end of one of said pressure responsive elements to one of said pressure sources, a connector having a rack and being slidably secured to said housing, one end of said connector being pivotally attached to the free end of one of said pressure responsive elements, a pinion gear pivotally secured to said housing in operable engagement with said connector rack, a pointer fixedly attached to said gear, a scale associated with said pointer for interpreting movements thereof, and linkage means operatively connecting the remaining end of said connector to the free ends of the remaining pressure responsive elements, two elements of said linkage means forming pointers for indicating relative movements between said connector and the free ends of said last-mentioned pressure responsive elements.

10. A load distribution indicator comprising, a plurality of pressure responsive elements disposed in a common plane and adapted to be connected to a like number of independent pressure sources, a housing for supporting a fixed end of each pressure responsive element, a plurality of tubes, each of said tubes operatively connecting the fixed end of one of said pressure responsive elements to one of said pressure sources, a connector having a rack and being slidably secured to said housing, one end of said connector being pivotally attached to the free end of one of said pressure responsive elements, a pinion gear pivotally secured to said housing in operable engagement with said connector rack, a pointer fixedly attached to said gear, a scale associated with said pointer for interpreting movements thereof, a linkage means operatively connecting the remaining end of said connector with the free ends of the remaining pressure responsive elements, two elements of said linkage means forming pointers having bases concentrically pivoted to said connector, and scales associated with said last-mentioned pointers for interpreting movements between said connector and said free ends of said last-mentioned pressure responsive elements.

11. A longitudinal load distribution indicator comprising, a casing, three pressure responsive elements adapted to be communicatively connected with three separate pressure sources constituting load supporting means, said elements being respectively fixedly connected at one end to said casing and being arranged in such a manner that the free end of one is movable in a direction substantially opposite to the direction of motion of the free ends of the other two, and means constrained to move in a given path corresponding substantially to the directions of motion of said elements and in response to the pressure differences of said elements.

12. A longitudinal load distribution indicator comprising, a casing, three pressure responsive elements adapted to be communicatively connected with three separate pressure sources constituting load supporting means, said elements being respectively fixedly connected at one end to said casing and being arranged in such a manner that the free end of one is movable in a direction substantially opposite to the direction of motion of the free ends of the other two, and means disposed between said elements and constrained to move in a given path corresponding substantially to the directions of motion of said elements and in response to the pressure differences of said elements.

13. A longitudinal load distribution indicator comprising, a casing, three pressure responsive elements adapted to be communicatively connected with three separate pressure sources constituting load supporting means, said elements being respectively fixedly connected at one end to said casing and being arranged in such a manner that the free end of one is movable in a direction substantially opposite to the direction of motion of the free ends of the other two, and slidable means constrained to move in a given path corresponding substantially to the directions of motion of said elements and in response to the pressure differences of said elements.

14. A longitudinal load distribution indicator comprising, a casing, three pressure responsive elements adapted to be communicatively connected with three separate pressure sources constituting load supporting means, said elements being respectively fixedly connected at one end to said casing and being arranged in such a manner that the free end of one is movable in a direction substantially opposite to the direction of motion of the free ends of the other two, means constrained to move in a given path corresponding substantially to the directions of motion of said elements and in response to the pressure differences of said elements, and means associated with said last mentioned means for interpreting the pressure ratio relation between the one of said elements and the other two.

15. A longitudinal load distribution indicator comprising, a casing, three pressure responsive elements adapted to be communicatively connected with three separate pressure sources constituting load supporting means, said elements being respectively fixedly connected at one end to said casing and being arranged in such a manner that the free end of one is movable in a direction substantially opposite to the direction of motion of the free ends of the other two, means constrained to move in a given path corresponding substantially to the directions of motion of said elements and in response to the pressure differences of said elements, and means associated with said last mentioned means for interpreting the pressure ratio relation between the one of said elements and the other two, including a pointer movable in opposite directions from a zero center position.

16. In a system for indicating the load distribution of an aircraft having a plurality of load-responsive devices, one of said devices being located in the plane of symmetry of the aircraft and other of said devices being located in a vertical plane normal to the plane of symmetry and longitudinally spaced and symmetrically arranged with respect to said first-mentioned device, an individual pressure-responsive element associated with each of said devices, and an indicating means, each of said elements having individual positive connection with said indicating means such that said indicating means responds to the combined effects of all of said pressure-responsive elements for indicating relative load distribution on all of said devices.

17. In a system for indicating the relative longitudinal and transverse positions of the center of gravity of an aircraft having three load-responsive devices, one of said devices being located in the plane of symmetry of the aircraft and the other two devices being located in a vertical plane normal to the plane of symmetry and longitudinally spaced and symmetrically arranged with respect to said first-mentioned device, an individual pressure-responsive element operable by each of said devices in accordance with the load affecting said device, and indicating means responsive to the combined effects of all of said pressure-responsive elements to indicate the relative longitudinal position of said center of gravity and responsive to the combined effects of the pressure-responsive elements operable by said other two devices to indicate the relative transverse position of said center of gravity.

18. In a system for indicating the longitudinal and transverse load distribution of an aircraft having three load-responsive devices, one of said devices being located in the plane of symmetry of the aircraft and the other two devices being located in a vertical plane normal to the plane of symmetry and longitudinally spaced and symmetrically arranged with respect to said first-mentioned device, a load-distribution indicator containing an individual pressure-responsive element operable by each of said devices, and indicating means in said indicator, each of said elements having an individual positive connection capable of transmitting both tension and compressive forces upon said indicating means to obtain a double-acting effect from each of said elements so that said indicating means is operatively responsive to the combined effects of all of said pressure-responsive elements for indicating relative load distribution with respect to each of said devices.

JEAN A. ROCHÉ.